US007043901B2

United States Patent
Goralski, Jr. et al.

(10) Patent No.: US 7,043,901 B2
(45) Date of Patent: May 16, 2006

(54) DEVICE AND METHOD FOR INTERNAL COMBUSTION ENGINE CONTROL

(75) Inventors: Christian Thomas Goralski, Jr., Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 10/393,410

(22) Filed: Mar. 20, 2003

(65) Prior Publication Data

US 2004/0182069 A1 Sep. 23, 2004

(51) Int. Cl.
*F01N 3/00* (2006.01)

(52) U.S. Cl. .............................. 60/285; 60/274; 60/284; 60/297

(58) Field of Classification Search .................. 60/274, 60/285, 286, 297, 284
See application file for complete search history.

(56) References Cited

U.S. PATENT DOCUMENTS

| 4,024,706 | A | | 5/1977 | Adawi et al. |
| 4,500,650 | A | | 2/1985 | Wyatt et al. |
| 4,678,770 | A | | 7/1987 | Wan et al. |
| 5,179,060 | A | | 1/1993 | Subramanian et al. |
| 5,437,153 | A | | 8/1995 | Takeshima et al. |
| 5,642,705 | A | * | 7/1997 | Morikawa et al. ........... 123/300 |
| 5,657,625 | A | * | 8/1997 | Koga et al. .................... 60/274 |
| 5,848,529 | A | | 12/1998 | Katoh et al. |
| 5,996,338 | A | * | 12/1999 | Hirota .......................... 60/285 |
| 6,209,526 | B1 | | 4/2001 | Sun et al. |
| 6,237,330 | B1 | * | 5/2001 | Takahashi et al. ............. 60/285 |
| 6,345,499 | B1 | * | 2/2002 | Nishimura et al. ........... 60/277 |
| 6,679,050 | B1 | * | 1/2004 | Takahashi et al. ............. 60/285 |
| 6,684,630 | B1 | * | 2/2004 | Uchida et al. ................. 60/284 |

* cited by examiner

Primary Examiner—Binh Q. Tran
(74) Attorney, Agent, or Firm—Allan J. Lippa; Alleman Hall McCoy Russell & Tuttle LLP

(57) ABSTRACT

A system for an engine has an upstream emission control device with a washcoat having a predetermined amount of precious metal disassociated with NOx storage material, where the upstream emission control device in a close coupled location to an exhaust manifold of the engine. The system also includes a downstream emission control device coupled to the upstream emission control device. Further, a controller is used for operating the engine lean with retarded ignition timing to generate heat and raise temperatures of said upstream and downstream emission control devices. The controller also determines whether temperature of said upstream device has reached a predetermined value, and in response to said determination, operates the engine rich at least to reduce NOx stored in said upstream emission control device during said lean operation.

18 Claims, 8 Drawing Sheets

DEVICE AND METHOD FOR INTERNAL COMBUSTION ENGINE CONTROL

BACKGROUND OF THE INVENTION

Engines typically use emission control devices, such as catalytic converters, to reduce regulated emissions. However, during cold engine starting, catalysts may not be able to react these emissions since the catalyst temperature is too low. As such, the engine can be operated lean with retarded ignition timing to generate heat, and thereby raise catalyst temperature more rapidly.

The inventors herein have recognized a disadvantage with such an approach when applied with a known lean burn engine configuration. In particular, as described in U.S. Pat. No. 6,209,526, a downstream NOx absorbent is used to retain NOx emissions when operating lean, and release and reduce stored NOx when operating stoichiometric or rich. The inventors herein have recognized, however, that during cold engine starting, it takes significant time for the dowtream catalyst to reach a temperature at which stored NOx can be reacted efficiently with stoichiometric or rich exhaust gasses due to its downstream location.

SUMMARY OF THE INVENTION

The above disadvantages are overcome by a system for an engine comprising:

an upstream emission control device with a washcoat having a predetermined amount of precious metal disassociated with NOx storage material, said upstream emission control device in a close coupled location to an exhaust manifold of the engine;

a downstream emission control device coupled to said upstream emission control device; and a controller for starting the engine, operating the engine lean with retarded ignition timing to generate heat and raise temperatures of said upstream and downstream emission control devices, determining whether temperature of said upstream device has reached a predetermined value, and in response to said determination, operating the engine rich at least to reduce NOx stored in said upstream emission control device during said lean operation.

In this way, NOx can be stored in the upstream emission control device during engine cold starting, and then reacted when the temperature reaches a predetermined value. This results in earlier reaction of stored NOx and lower NOx emissions. Further, lean operation can be enabled sooner since the upstream catalyst is heated quicker than if it were located downstream. Finally, during stoichiometric conditions, high conversion efficiency of CO and HC is possible.

DETAILED DESCRIPTION

Figure 1:
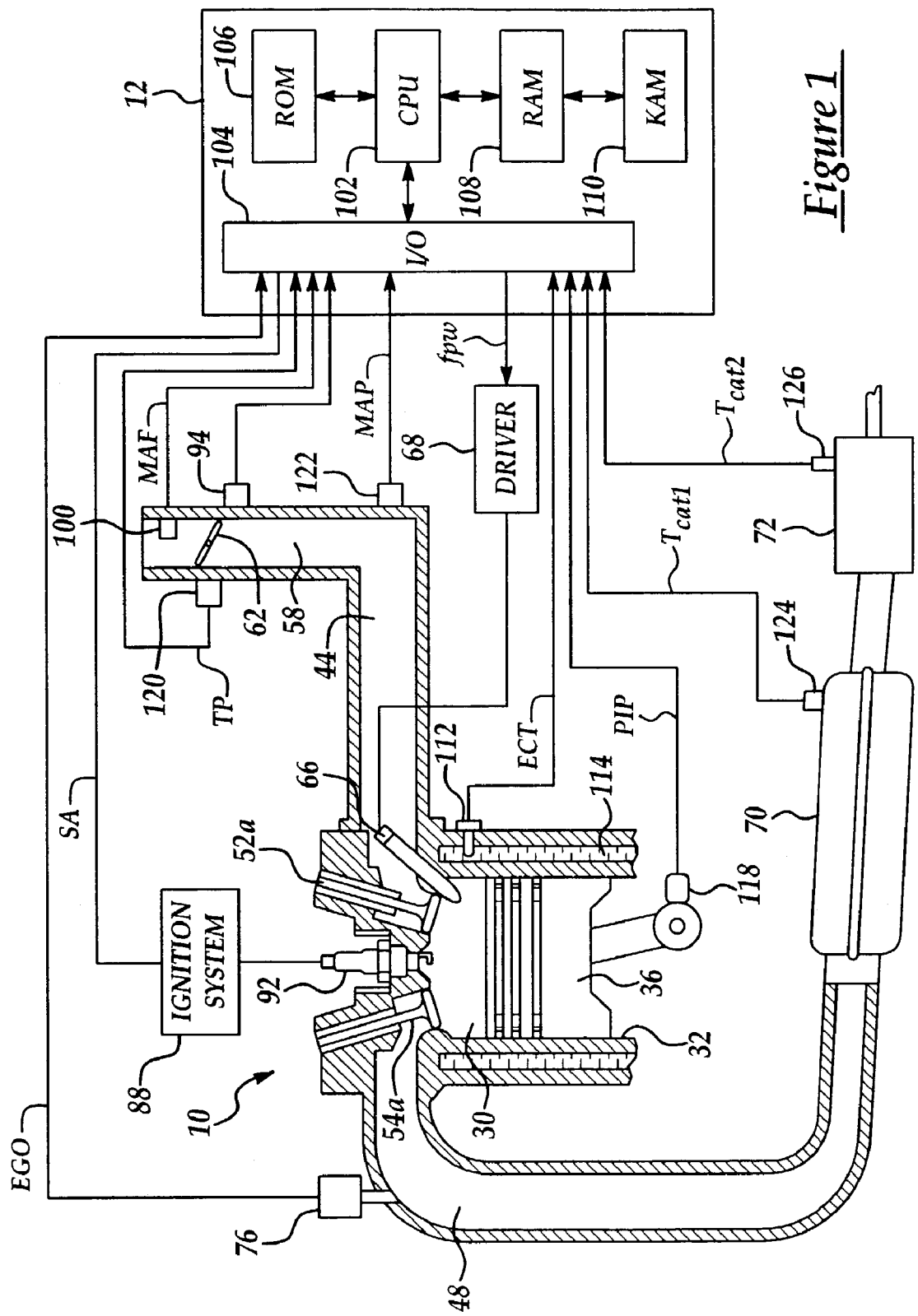
FIG. 1 show an engine system configuration according to an example embodiment of the invention.

Direct injection spark ignited internal combustion engine 10, comprising a plurality of combustion chambers, is controlled by electronic engine controller 12. Combustion chamber 30 of engine 10 is shown in FIG. 1, including combustion chamber walls 32 with piston 36 positioned therein and connected to crankshaft 40. In this particular example, piston 36 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), a bypass air passageway is arranged in, parallel with throttle late 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. Controller 12 adjusts fuel injected via injector 66 based on feedback from exhaust gas oxygen sensors (such as sensor 76) to maintain the engine air-fuel ratio at a desired air-fuel ratio.

Second emission control device, which is described in more detail below, is shown positioned downstream of the first emission control device 70. Devices 70 and 72 each contain catalyst of one or more bricks. However, in an alternative embodiment, devices 70 and 72 can be different bricks in the same canister, or separately packaged. Several example embodiments of Devices 70 and 72 are described below.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature T1 of device 70 and temperature T2 of device 72 are inferred from engine operation. In an alternate embodiment, temperature T1 is provided by temperature sensor 124 and temperature T2 is provided by temperature sensor 126.

In another alternative embodiment, a port fuel injected engine can be used where injector 66 is positioned in intake manifold 44 to injected fuel toward valve 52a and chamber 30.

Figure 2:
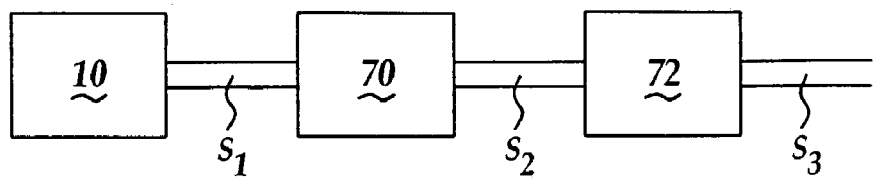
FIG. 2 shows alternative exhaust configuration according to another example embodiment of the invention.

Referring now to FIG. 2, a simplified block diagram describing an alternative exhaust system according to one aspect of the present invention is illustrated. In FIG. 2, engine 10 is shown coupled to upstream catalyst 70 and downstream catalyst 72. As described below, catalyst 70 contains elements x, y and z, and catalyst 72 contains elements a, b and c. In this way, the engine is operated lean and NOx and oxygen (oxidants) are stored primarily in catalyst 70. Then, once the NOx and oxygen capacity of catalyst 70 is neared (or the amount of NOx breakthrough reaches a predetermined level) the engine is switched to rich or stoichiometric operation to reduce the oxidant stored in catalyst 70 and any breakthrough oxidants stored in catalyst 72. However, according to the present invention, the engine is operated rich primarily to reduce the oxidants stored in catalyst 70 and once this is substantially accomplished the engine is returned to lean operation. Note that this is just one example of operation according to the present invention and various other modes can be used, particularly, the lean operation can be extended to allow some oxidant storage in catalyst 72. However, if catalyst 72 is a catalyst optimized for oxygen storage rather than NOx storage, the engine is typically operated lean so long as the NOx is being stored in catalyst 70. In this way, efficient NOx purges can be performed since little fuel is wasted purging stored oxygen in catalyst 72 since it is downstream of catalyst 70.

FIG. 2 also shows three sensors (S1, S2, and S3) in the system. S1 is coupled between the engine 10 and catalyst 70. Sensor S2 is coupled between catalyst 70 and catalyst 72. Sensor S3 is coupled downstream of catalyst 72.

The sensors are generically described as sensors S1 through S3 and can be various types of sensors such as, for example: heated exhaust gas oxygen sensors, universal exhaust gas oxygen sensors, NOx sensors, combined NOx/UEGO sensors, or temperature sensors, or any combination of the above sensors.

Figure 3A:
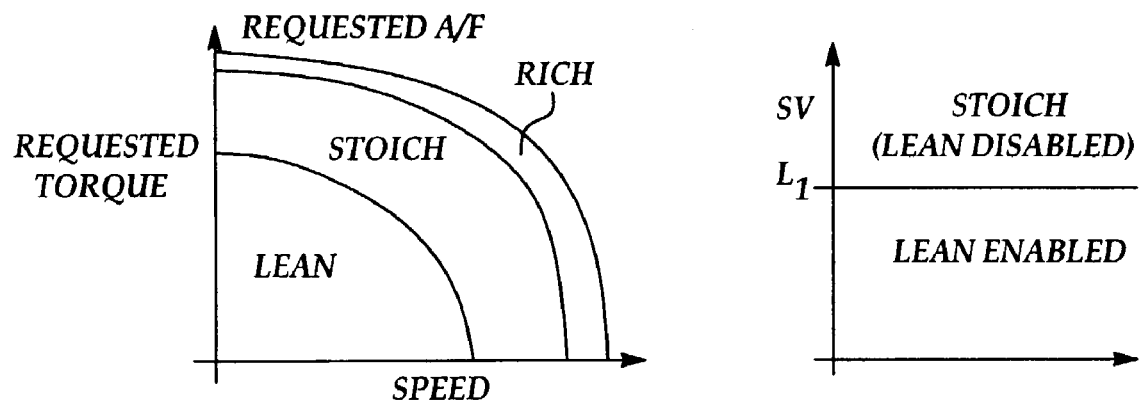
FIG. 3 shows various graphs illustrating aspects of an example embodiment of the invention.
Figure 3B:
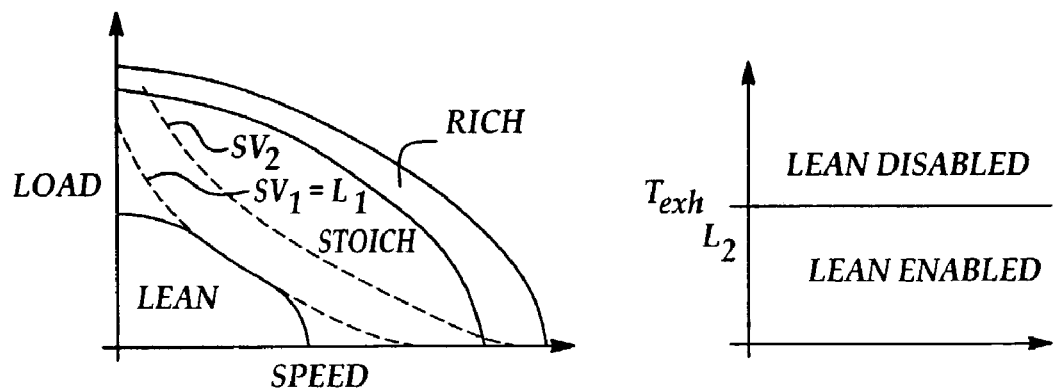

Referring now to FIG. 3, various graphs are shown illustrating operation according to the present invention. The first figure shows the requested air fuel ratio is a function of the requested torque and engine speed. The requested air fuel regions are broken into a lean region, a stoichiometry region, and a rich region. Note that stoichiometric as used herein refers to oscillatory feedback air-fuel ratio control about the stoichiometric air fuel ratio.

The second graph of FIG. 3 shows whether lean operating conditions are enabled based on exhaust or engine space velocity. In other words, even if the requested torque and engine speed are in the lean region of the first figure, the stoichiometric mode will be selected if the space velocity is greater than the threshold level L1 on FIG. 3.

The third graph of FIG. 3 shows whether lean operation is enabled based on exhaust gas temperature (estimated or measured from a sensor at location of sensor S1). In other words as with respect to the second graph of FIG. 3, even if the requested torque and speed are in the lean region of the first graph, if the exhaust gas temperature is greater than the threshold L2, the lean operation is disabled and the engine is operated at the near stoichiometric value. Note that both L1 and L2 can be adjusted based on engine operating conditions.

Figure 4:
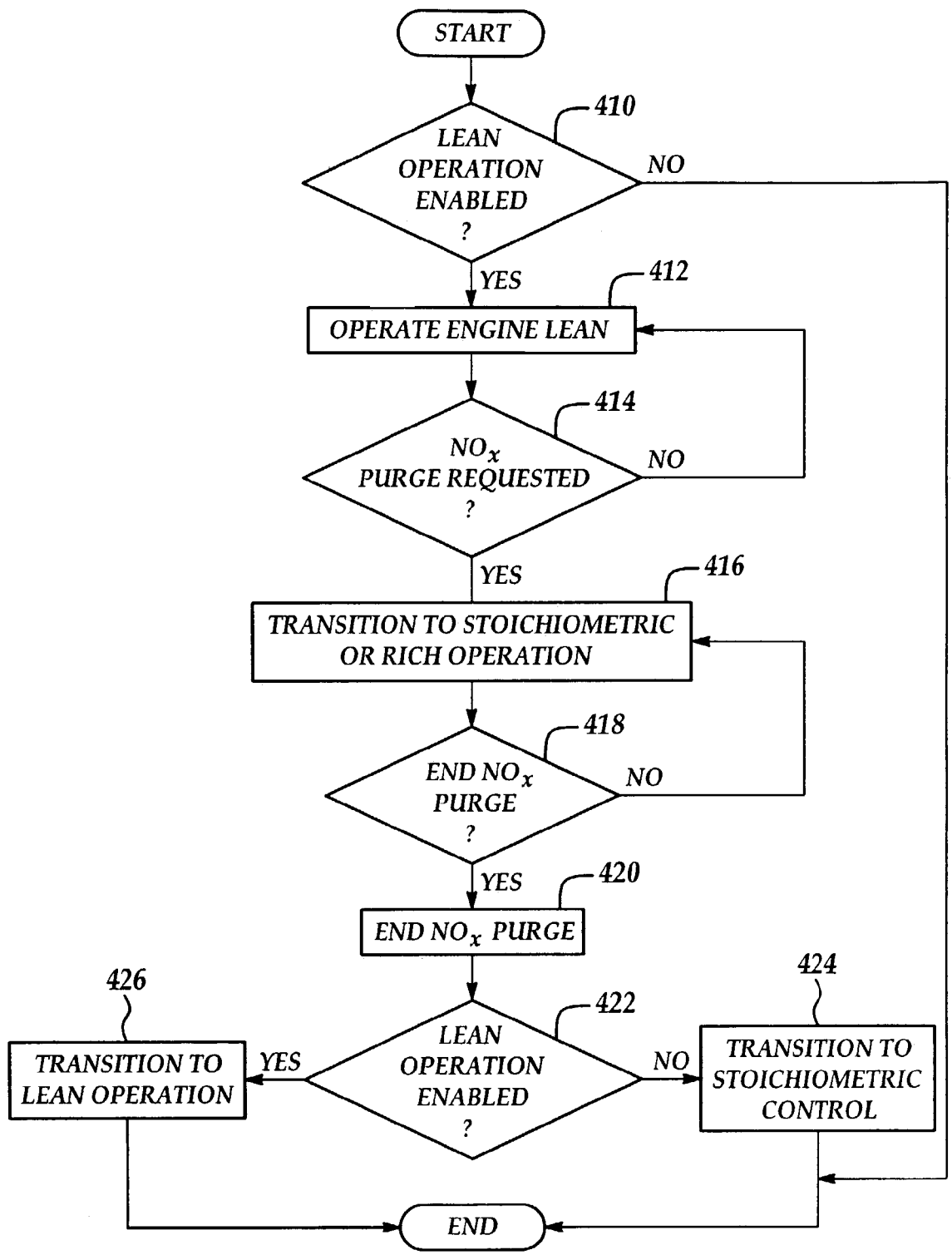
FIGS. 4–5 are high level flowcharts illustrating operation according to an example embodiment of the invention.

Referring now to FIG. 4, a routine describing operation according to the present invention is illustrated. In general terms, the routine describes how the engine is operated to optimize engine fuel economy by performing efficient NOx purging using an upstream catalyst capable of significant NOx storage and a downstream catalyst optimized for operation near stoichiometry. However, as described above, there are various alternate embodiments of the present invention and the routine described in FIG. 4 is applicable generally to these.

First, in step 410, the routine determines whether lean operation is enabled. In other words, the routine determines the desired or requested air-fuel ratio based on the requested torque and engine speed. Then, the routine determines whether the space velocity is greater than the threshold L1 or whether the exhaust gas temperatures is greater than threshold L2. If neither the space velocity gas temperature are above the respective thresholds, and the requested torque and engine speed indicate a requested lean air-fuel ratio, then the answer to step 410 is yes, and the routine continues to operate the engine lean in step 412.

Next, in step 414, the routine determines whether a NOx purge is requested. In particular, the routine estimates the amount of NOx stored in catalyst 70 and determines whether this estimate is greater than the threshold B1. The amount of NOx stored in catalyst 70 is estimated based on various operating conditions such as, for example: engine speed, engine load, temperature, and space velocity. Alternatively, the routine can determine if a NOx purge is requested by calculating whether the tailpipe NOx emissions are above a predetermined threshold, or whether the amount of NOx exiting catalyst 70 is above a threshold value. In still another alternative embodiment, the routine can determine whether a NOx purge should be requested based on the storage efficiency of NOx in catalyst 70.

When the answer to step 414 is no, the routine returns to step 412 and continues the lean operation, provided the lean operating conditions determined in step 410 are still present. Alternatively, when the answer to step 414 is yes, the routine continues to step 416 where the engine is transitioned to stoichiometric or rich operation to perform the NOx purge.

During the NOx purge, the routine determines in step 418 whether to end the NOx purge. In one example, the routine determines whether the integral of an exhaust gas oxygen sensor (as sensor S2) is greater than a preselected value. In other words, the routine determines whether an integrated amount of rich exhaust gases have exited catalyst 70. Alternatively, the routine can determine whether a predetermined rich time interval, or a predetermined number of rich engine cycles has been completed. Alternatively, the routine can determine whether an output of an exhaust gas oxygen sensor as sensor S2 indicates a value richer than a preselected value.

When the answer to step 418 is no, the routine continues to step 416 and continues to operate in the NOx purging condition. Alternatively, when the answer to step 418 is yes, the routine continues to step 420 to end the NOx purge.

Continuing with FIG. 4, in step 422, the routine determines whether lean operation is still enabled by determining factors such as described above herein with regard to step 410. When the answer to step 422 is yes, the routine transitions to return the engine to lean operation in step 426. Alternatively, when lean operation is no longer requested or enabled, the routine continues to step 424 to transition to stoichiometric control.

The stoichiometric mode of operation, as described above, refers to operating the engine with the desired air-fuel ratio oscillating around the stoichiometric value (within very close limits to stoichiometry, for example, plus or minus 5%).

Figure 5:
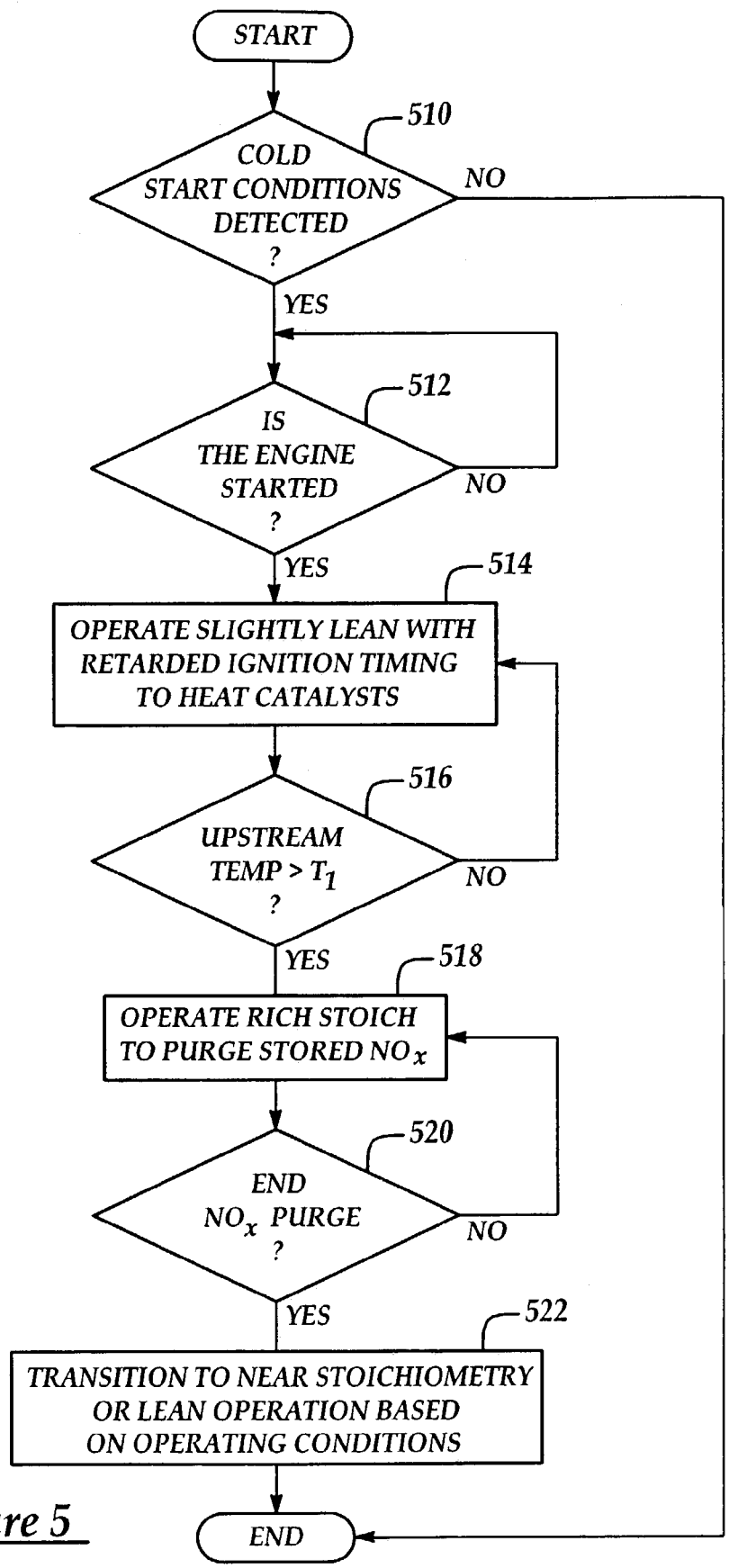

Referring now to FIG. 5, the routine is described for controlling engine cold starts. In general terms, the routine controls the engine, after cranking, to operate with a slightly lean air-fuel ratio with retarded ignition timing to heat the ignition control device 70 and 72. This operation is continued until the upstream catalyst temperature reaches a threshold temperature T1. After this time, the engine is operated stoichiometric or rich to purge NOx stored during the initial lean operation.

First, in step 510, the routine determines whether cold start conditions have been detected. This can be based on various conditions such as, for example: time since engine start, time since the last engine start, exhaust temperature, and other conditions. When the answer to step 510 is yes, the routine continues to step 512. In step 512, the routine determines whether the engine has been started. When the answer to step 512 is no, the routine continues monitoring whether the engine has been started. Various parameters can be used to detect an engine start, such as operating the engine with a predetermined number of firings, determining whether the engine speed has reached a threshold value, determining whether the engine has been turning greater than a predetermined time, and various others.

When the answer to step 512 is yes, the routine continues to step 514. In step 514, the routine operates the engine slightly lean with retarded ignition timing to generate heat for heating the emission control devices and exhaust gas system. Next, in step 516, the routine determines whether the upstream temperature is greater than the threshold T1. Various methods can be used in step 516, such as determining whether estimated exhaust gas temperature has reached a predetermined threshold, whether catalyst temperature of upstream catalyst 70 has reached a predetermined temperature, whether an estimate of catalyst temperature has reached a predetermined threshold, and various others When the answer to step 516 is no, the routine returns to step 514 to continue lean operation with retarded ignition timing. In this way, the exhaust catalysts are heated to increase their temperature. Alternatively, when the answer to step 516 is yes, the routine operates the engine stoichiometric or rich to purge NOx stored in the emission control devices.

From step 518, the routine continues to step 520 where a determination is made as to whether to end the purge of stored NOX. This can be determined in various ways such as, for example, operating rich for a predetermined time, using a sensor located downstream of the emission control device to be purged of NOx, estimating the amount of fuel delivered to the exhaust system, and various others. When the answer to step 520 is yes, the routine transitions in step 522 to near stoichiometric or lean operation based on operating conditions. Otherwise, when the answer to step 520 is no, the routine returns to step 518 to continue the NOx purge.

In this way, it is possible to lower vehicle tailpipe NOx emissions during cold start since the NOx can be stored in the upstream catalyst and then purged by rich operation once the predetermined temperature has been reached.

Figure 6:
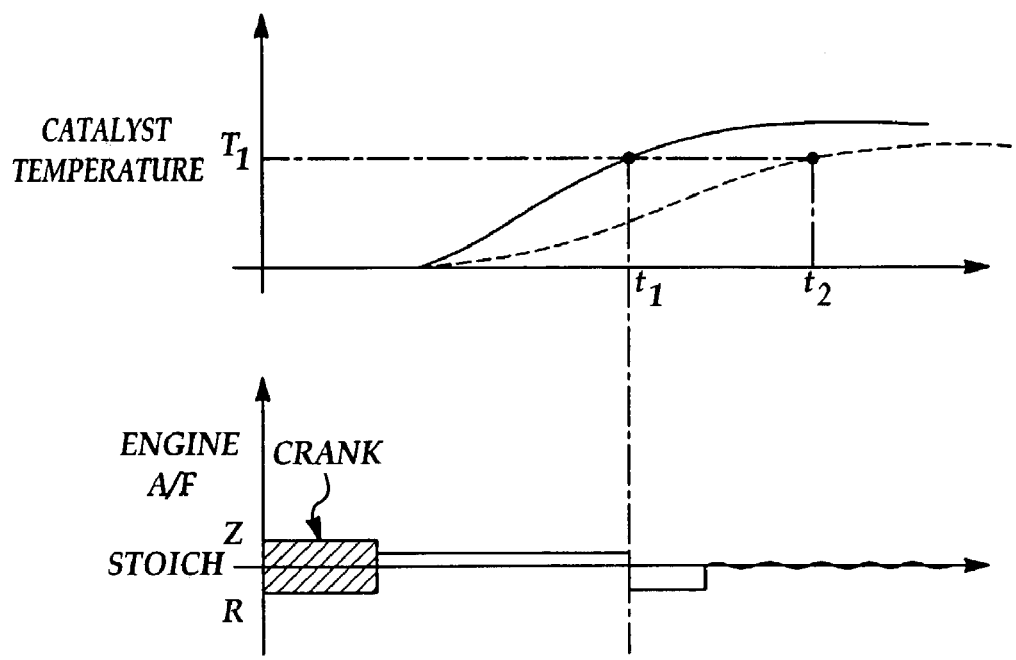
FIG. 6 shows a graph illustrating example performance according to an aspect of the invention.

Referring now to FIG. 6, graphs illustrating operation according to the present invention are described. The top graph of FIG. 6 illustrates the gradual increase of catalyst temperatures for the upstream and downstream catalysts 70 and 72. In particular, the solid line shows the temperature of upstream catalyst 70, whereas the dashed line shows the temperature of downstream catalyst 72. As expected from a cold start, the upstream catalyst heats up quicker than the downstream catalyst. The present invention uses this to advantage by retaining oxidants such as NOx in the upstream catalyst and then purging the stored NOx before the storage capacity of the upstream catalyst has been depleted, thereby minimizing fuel used to reduce oxidants, such as oxygen, stored in the downstream catalyst 72. Furthermore, during a cold start, the present invention uses the location of the upstream catalyst to advantage by retaining NOx produced at engine starting conditions before the time t1. After the time t1 (when the upstream catalyst has reached temperature T1) the engine is transitioned to rich to purge the NOX stored in the upstream catalyst as described in the lower graph of FIG. 6 In particular, the lower graph of FIG. 6 shows the engine air-fuel ratio corresponding to the temperatures in the top graph. As shown, once the engine exits engine cranking and run-up, the engine is operated slightly lean (between about 14.6 and 15:1 air-fuel ratios). During this time NOx emitted from the engine is stored in catalyst 70. After time t1, the engine is transitioned to rich as described above to purge the stored NOx.

Note that the catalyst's ability to store and reduce NOx is a function of temperature, and if the NOX storage is primarily used in the downstream catalyst 72, the engine would have to wait until time t2 to be able to take advantage of the NOx storage ability. However, according to the present invention, by using the catalyst configuration of the present invention it is possible to earlier take advantage of this NOX storage and purging ability, and thereby reduce NOx emissions during an engine cold start.

Figure 7:
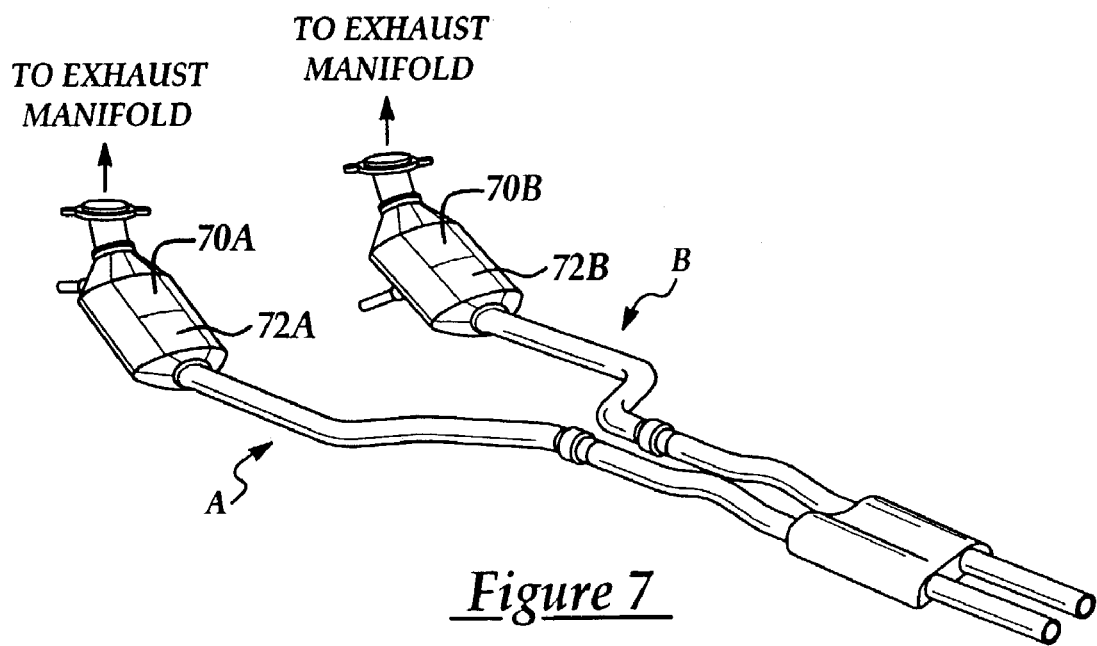
FIG. 7 shows an example exhaust configuration.

FIG. 7 shows the catalysts 70 and 72 in a close-coupled location to the engine. Further, the Figure shows a dual-pipe configuration, where there are two sets of catalysts 70A,B and 72A,B. The two exhaust paths A and B do not mix in this example. However, in an alternative embodiment, a Y-pipe configuration can be used where the gasses come together.

Figure 8:
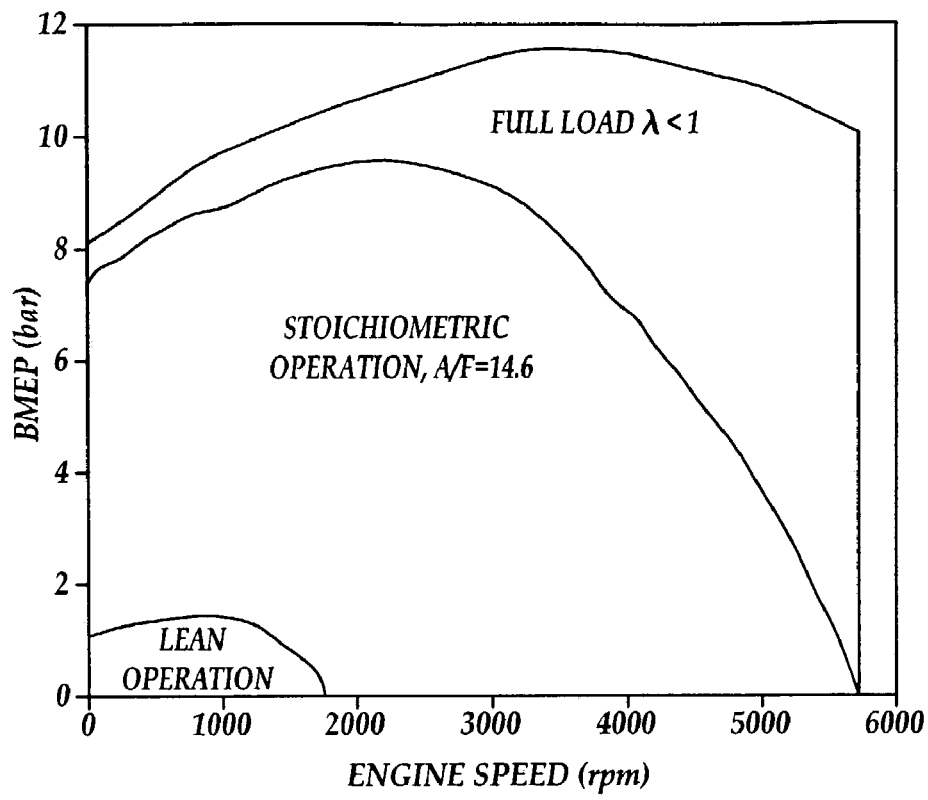
FIG. 8 is a schematic of engine speed versus brake mean effective pressure (BMEP) at different air/fuel ratios.

In an alternative example embodiment, the engine is run under stoichiometric conditions most of the time, except under low load (brake mean effective pressure (BMEP)<1.2 bar), low engine speed (RPM<1750) conditions, when the engine is run under stratified-charged or homogenous lean conditions. Lean operation can also be selected based on engine torque and engine speed. The operation diagram of a stratified charged engine is schematically shown as FIG. 8. Also shown in FIG. 8 is the operation range when the engine is run under stoichiometric condition and under full load with air to fuel ratio under net fuel rich condition.

For engines operated as above, and any other internal combustion engine designed to operate at least partially under lean conditions, the present invention provides a catalyst system capable of reducing engine emissions.

Figure 9:
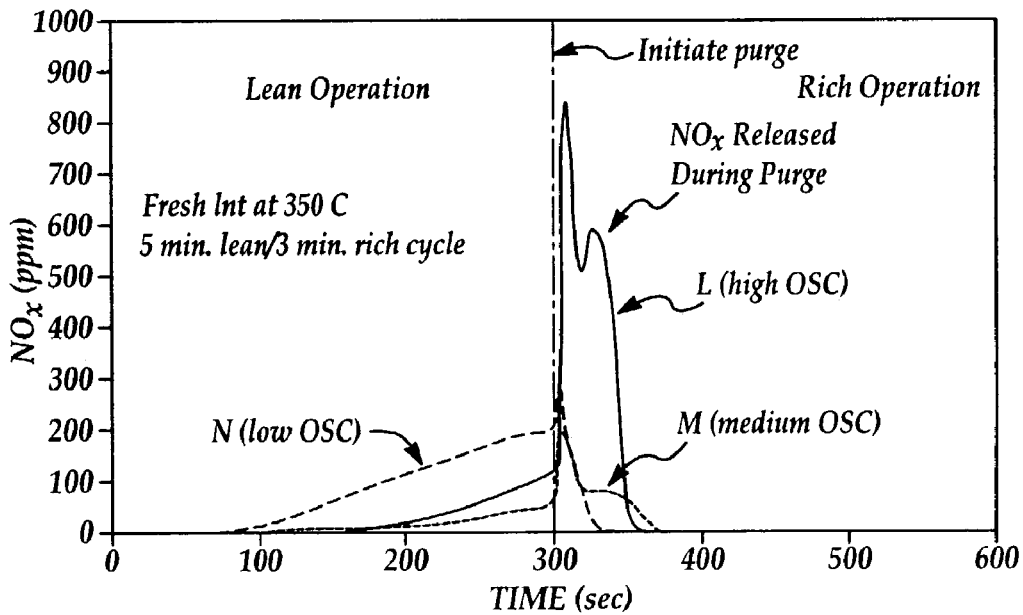
FIG. 9 is a graph showing NOx conversions and NOx release of catalysts with different oxygen storage capacity ("OSC") during lean to rich transitions.

As set forth above, FIG. 9 depicts typical lean NOx release during the lean-rich transition of an emission control device that is capable of storing oxidants, such as oxygen and NOx. The NOx released during the purge cycle of the catalyst is believed to occur due to the exothermic heat generated from the oxidation of reductants CO, HC and $H_2$ by the oxygen released from the oxygen storage material.

Figure 10:
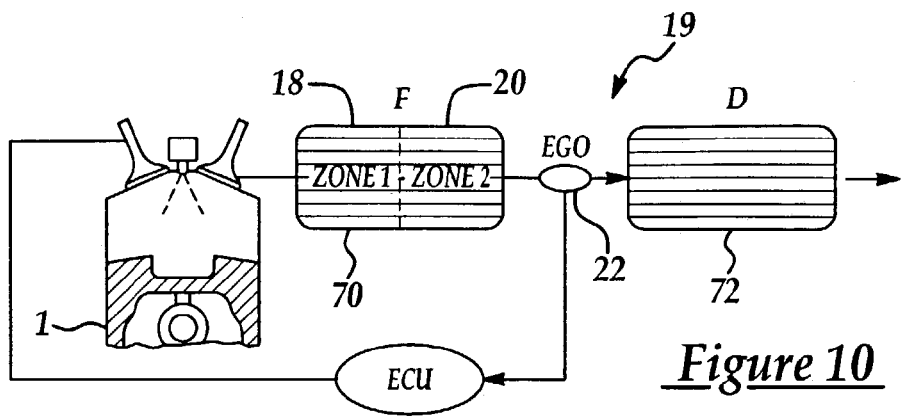
FIG. 10 is a schematic view of a catalyst system that incorporates the present invention, showing a first catalyst having two zones and a second catalyst.

FIG. 10 depicts an example embodiment of the catalyst system 19, a system for the treatment of emissions both under stoichiometric operation and under lean conditions (e.g., during idling and low speed cruises). As shown, the catalyst system 19 includes two catalysts 70, 72 in a close-coupled location. The forward catalyst 70 is optimized to function when the engine 10 is operated under lean conditions. The forward catalyst 70 will store excess NOx during lean operation and then release and convert the NOx when the engine 10 switches to rich conditions. The downstream catalyst 72 is optimized to effectively convert HC, CO, and NOx under stoichiometric operations, as well as convert any remaining lean NOx emissions not adsorbed by the forward catalyst 70.

The forward catalyst 70 consists of two zones 18, 20. It should be noted that this invention also contemplates the use of layers in place of zones. In one embodiment of the invention, these different layer or zones make it possible to physically segregate oxidation components to provide NOx storage, while at the same time providing efficient HC/CO oxidation activity. Note that different phases could also be used.

In one approach, two components are included in the catalyst washcoat such that it would have both NOx storage and high HC/CO conversion activity in the same catalyst. To achieve efficient NOX storage, a highly interacted NO oxidation catalyst and NO2 storage material are used. This is typically a precious metal (Pt) and Ba, but other suitable materials could be substituted such as cesium or potassium. This allows efficient transfer of the oxidized NO2 to the storage material. Unfortunately, this reduces the activity of the Pt to oxidize HC and CO. Hence, for good oxidation activity, Pt and/or Pd are placed on Al2O3 or Ce/Zr where the Pt/Pd will have good oxidation activity. To create a catalyst with both HC/CO activity and NOx storage, the two phases are segregated so that the Ba does not interfere (or does so less than a preselected amount) with the oxidation activity of the PGM/Al2O3 phase. This can be accomplished by creating separate phases of the material where the Pt/Pd is first fixed on one support (Al2O3 or Ce/Zr mixed oxide) and Pt/Ba mixture is fixed on an Al2O3 support. These separate phases could then be either mixed together and washcoated or preferably could be washcoated as two distinct layers. Another feature of this process would be to use a solvent in which none of the active materials has appreciable solubility so that they would not be mixed when a slurry was prepared in the washcoat process. In this way, the problems with NOx release are overcome. In other words, from a macro viewpoint, a selected amount of precious metal is placed in the washcoat that is not associated with NOx storage materials such as Ba. In one example, between 30–70% (by mass) of the precious metal is placed in the washcoat that is not associated with NOx storage materials. Specific ranges include: 10–20, 20–30, 30–40, 40–50, 60–70, and/or 80–90. Another example includes 50–80%.

Zone 18 is, in one example, made from a foraminous substrate, such as an alumina substrate that functions as a carrier for the catalyst material and acts as a passage for the exhaust gas stream. The substrate is coated with a high loading of a precious metal (PM) such as Pt, Pd and/or Rh. Zone 18 further includes oxides of aluminum, alkali metals or alkaline earth metals, or a combination of the two, such as barium oxide, magnesium oxide, or potassium oxide The total amount of alkali metals or alkaline earth metals or a combination of the two ranges from 2–15 (wt) %. Zone 18 is, however, devoid of cerium. In one embodiment, zone 18 of the forward catalyst 70 consists of platinum and rhodium loaded on an alumina substrate in the ratio of 5:1 to 25:1 with a total loading of approximately 60–300 g/ft$^3$. In embodiment, the Rh is anchored on 3–5% (wt) $ZrO_2$ particles. The $Al_2O_3$ substrate is stabilized by approximately 1–8% (wt) $La_2O_3$.

Zone 20 of the forward catalyst 70 is also made from a foraminous substrate, usually alumina that functions as a carrier for the catalyst material. Zone 20 includes oxides of aluminum, alkali metals, alkaline earth metals, rare earth metals, or combinations thereof and a lower loading of precious metals (PM) than zone 18. Zone 20 may optimally include oxides of zirconium. In one embodiment, the alumina substrate in zone 20 is coated with a solution containing 10–40% (wt) of BaO and/or MgO on an $Al_2O_3$ washcoat. In one embodiment, zone 20 of the forward catalyst 70 consists of Pt and Rh loaded on an alumina substrate in the ratio of 1:1 10:1, with a total loading of about 10–100 g/ft$^3$. Zone 20 can include a small amount of mixed oxides of zirconium and cerium.

In alternative embodiment, forward zone 18 of catalyst 70 includes between 0.1 and 6% (wt) BaO and/or MgO washcoat on alumina. In a specific example, between 1 to 3% (wt) of BaO is utilized. In another example, 3 to 9% is utilized. This allows a predetermined amount of NOx storage, but also allows high retention of HC and CO conversion during stoichiometric operation. Thus, by keeping amount of barium in these example ranges, this allows efficient stoichiometric operation (high HC and CO conversion) at higher temperatures, and therefore catalyst 70 can be located upstream. Note that the upstream catalyst 70 can be close coupled to the engine exhaust and receive untreated exhaust gasses from the engine. I.e., exhaust gasses that have not passes through any other upstream catalytic converters in a separate canister.

The downstream catalyst 72 is manufactured in a method similar to zone 18. The downstream catalyst 72 also contains a catalyst material, PM-Rh, wherein the precious metals (PM) can be platinum, palladium or combinations thereof, preferably platinum and rhodium in a ratio of Pt/Rh 5:1–15:1. In addition to precious metals (PM), this downstream catalyst 72 includes oxides of aluminum, alkali metals or alkaline earth metals and a high concentration of mixed oxides of zirconium and cerium. In one embodiment, the total loading of the catalyst material in the downstream catalyst 72 is about 10 g/ft$^3$–120 g/ft$^3$. In one embodiment, both Pt and Rh are anchored on 5–30% (wt) high surface area Ce/Zr with high $O_2$ kinetics (e.g., Ce/Zr=50:50 molar ratio). The alumina washcoat is optionally also stabilized by 2–15 (wt) % BaO. Optionally, the downstream catalyst 72 may also include hydrogen sulfide emission suppressants such as nickel oxide.

The foregoing catalyst system 19 reduces the oxygen storage function in the front zone of the first catalyst, so that NOx release is minimized. The reduction of oxygen storage function in the front zone is also believed to minimize the fuel required to purge the catalyst as described herein. The forward catalyst 70 functions to store the NOx produced by engine 10 during lean operation. When the engine 10 is switched from lean to rich conditions for the purge of the first catalyst, there is minimum stored oxygen so that the oxidation reaction such as CO with $O_2$ does not cause an exothermic reaction in zone 18 and thus there is minimal release of unreduced NOx. The first catalyst 70 can be purged and the stored NOx converted when an engine control module determines that the NOx storage capacity of the first catalyst is approached.

Optionally, an exhaust gas oxygen sensor 22 is positioned upstream of the catalyst 72 between the forward catalyst 70 and the downstream catalyst 72, as shown in FIG. 3. Under this arrangement, there is a minimal fuel economy penalty from the oxygen storage capacity (OSC) of catalyst 72. Using this arrangement, the oxygen storage function of the downstream catalyst 72 is minimized so that minimal NOx release occurs due to the exothermic reaction described above. Additionally, the cerium-free first zone and the lower loading of cerium in the second zone of the forward catalyst help to minimize the fuel penalty attributed to the purges.

Figure 11A:
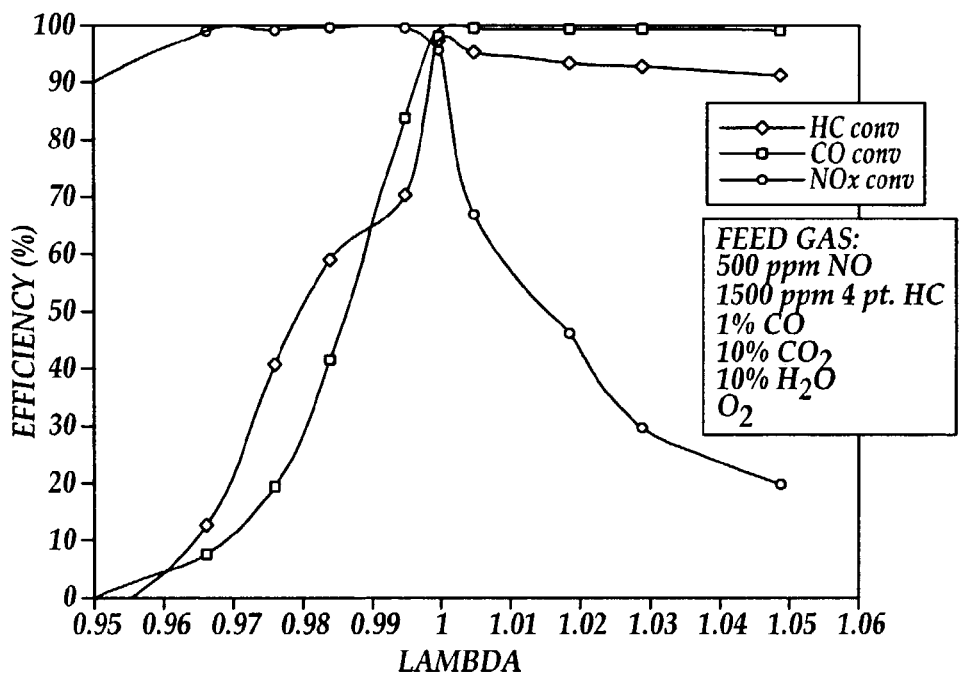
FIG. 11a is a graph of conversion efficiency for converting HC, CO and NOx for the zoned catalyst system described in example 1.
Figure 11B:
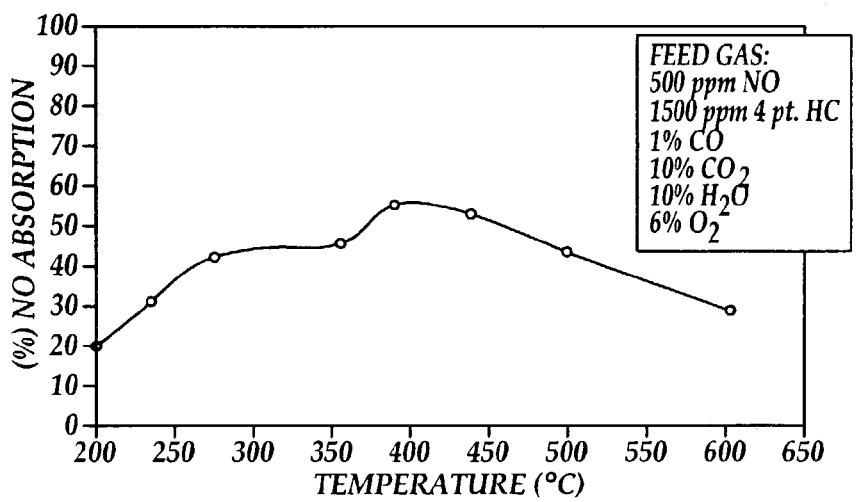
FIG. 11b is a graph of NOx adsorption versus temperature for the zoned catalyst system described in example 1.

FIGS. 11a and 11b show the experimental data on the effectiveness of the catalyst system 19. FIG. 11a shows the effectiveness in treating steady state HC, CO, and NOx and steady state lean NOx after being aged on a pulsator at 850° C. for 50 hr with a space velocity of 50,000 hr$^{-1}$. As seen in FIG. 11a, at $\lambda \leq 1$, HC, CO and NOx conversion is between 95–100% efficient. The data in FIG. 4a was obtained using the following feed gas: 500 ppm NO, 1500 ppm HC, 1% CO, 10% $CO_2$, 10% $H_2O$ and a varying amount of $O_2$. FIG. 11b shows the steady state lean NOx performance of an 850° C. aged catalyst system with a volumetric space velocity 30,000 hr$^{-1}$. As seen in FIG. 11b, because of this invention, NO is adsorbed over a wide range of operating temperatures, from 200° C.–600° C. and thus more effective for NOx reduction under a wide range of temperature parameters.

The data in FIG. 11b was obtained using the following feed gas: 500 ppm NO, 1500 ppm HC, 1% CO, 10% $CO_2$, 10% $H_2O$ and 6% $O_2$.

This catalyst system is expected to be used in automotive vehicles for emission treatment in the exhaust gas system where it functions to oxidize hydrocarbons, carbon monoxide, and reduce nitrogen oxides to desired emission levels.

Figure 12A:
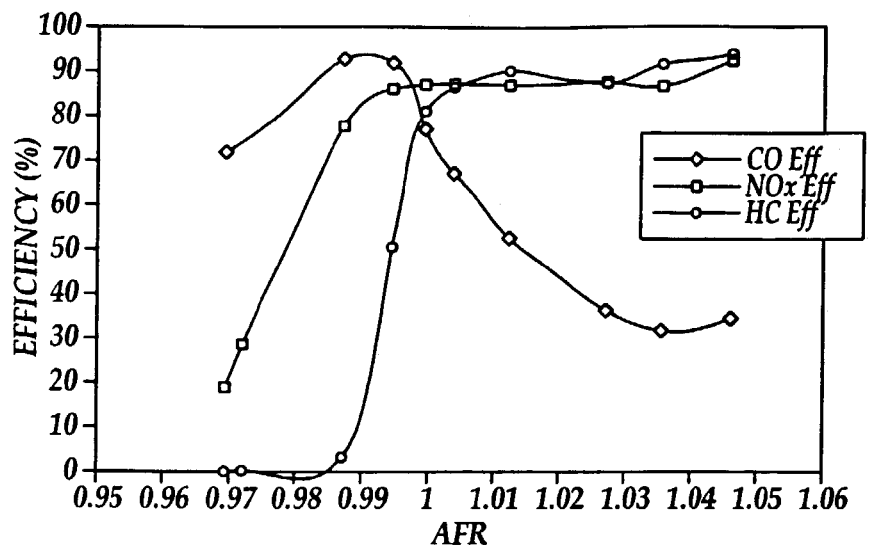
FIG. 12a is a graph of conversion efficiency for converting HC, CO and NOx for the comparative catalyst described in example 2.

FIG. 12a is a graph illustrating CO, NOx and HC efficiency for the catalyst described in Example 2. FIG. 12a further illustrates the lambda sweep of the catalyst described in Example 2.

Figure 12B:
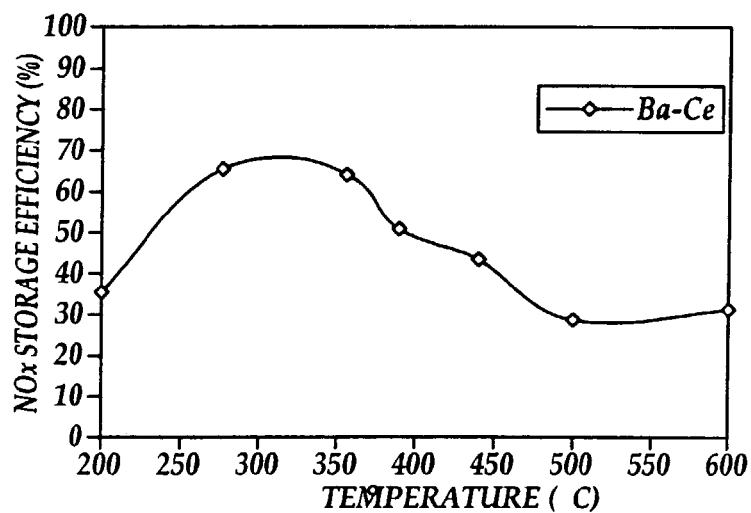
FIG. 12b is a graph of NOx adsorption versus temperature for the comparative catalyst described in example 2.

FIG. 12b is a graph illustrating the temperature profile of the lean catalyst prepared for Example 2, aged as provided in FIG. 11b.

Each catalyst is deposited or washcoated on a substrate (mechanical carrier) made of a high temperature stable, electrically insulating material such as cordierite, mullite, etc. A mechanical carrier is, in one example, comprised of a monolithic magnesium aluminum silicate structure, i.e., cordierite, although the configuration is not critical to the catalyst system of this invention.

The surface area of the monolithic structure provides 50–1000 meters square per liter structure, as measured by nitrogen adsorption. Cell density should be maximized consistent with pressure drop limitations and is, in one example, in the range of 200–800 cells per square inch of cross-sectional area of the structure. The substrate may be in any suitable configuration, often being employed as a-monolithic honeycomb structure. Other configurations useful in this invention and suitable in an exhaust gas system will be apparent to those skilled in the art in view of the present disclosure.

Various techniques for providing an oxide washcoat on a substrate can be used. Generally, a slurry of the mixed metal oxide particles and optionally stabilizer particles are coated on a substrate, e.g., added by dipping or spraying, after which the excess is generally blown off. After the slurry of mixed metal oxide particles are coated on the substrate, the substrate is heated to dry and calcine the coating, generally at a temperature of about 600° C. for about 2–3 hours. Calcining serves to develop the integrity of the ceramic structure of the washcoated oxide coating. The total amount of the oxide washcoat carried on the substrate is about 10–30% (wt), based on the weight of the substrate coated. Several coatings of the substrate and the washcoat may be necessary to develop the desired coating thickness/weight on the substrate.

The precious metals may be provided on the calcined oxide coating by any technique including the well known wet impregnation technique from soluble precious metal precursor compounds. Water soluble compounds can be used, including, but not limited to, nitrate salts and materials for platinum like chloroplatinic acid. As known in the art, after impregnating the washcoat with the precursor solution, it is dried and heated to decompose the precursor to its precious metal or precious metal oxide. The precursor may initially decompose to the metal but be oxidized to its oxide in the presence of oxygen. While some examples of precious metal precursors have been mentioned above, they are not meant to be limiting. Still other precursor compounds would be apparent to those skilled in the art in view of the present disclosure.

In addition to this incorporation from a liquid phase, the precious metal, such as platinum, may be provided by sublimation of platinum chloride or other volatile platinum salts, by a solid state exchange in the 300–500° C. temperature range using labile platinum compounds. There is no criticality to the type of precursor compounds that may be used to provide the precious metal according to this invention.

Additionally, co-precipitation techniques can also be used to form the catalyst. According to such techniques, the soluble salts can be dissolved in a solvent, for example, nitrates of the rare earth metals are dissolved in water. Co-precipitation is then obtained by making the solution basic, e.g., a pH of 9 by adding a base like ammonium hydroxide. Other soluble metal compounds such as, for example, sulfates and chlorides, may be used as may mixtures or various soluble compounds, e.g., nitrates with chlorides. The precipitate would then be heated to decompose it to the mixed metal oxide. This heating or calcination usually would be carried out at temperatures of up to 500° C. It should be noted that the way in which the oxide is obtained for use in forming the catalyst is not critical to the invention.

Figure 13:
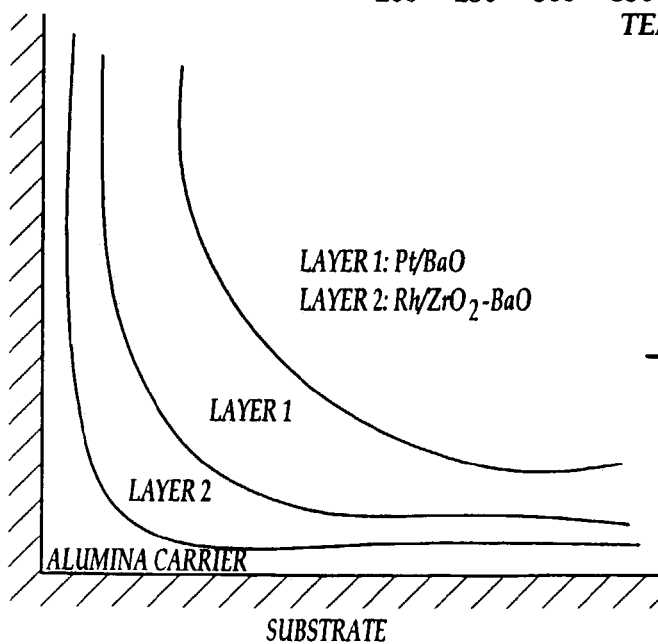
FIG. 13 is a schematic view of a catalyst system that incorporates the present invention, showing a catalyst having two layers.

In yet another embodiment of this invention, the forward catalyst 70 has a layered structure, rather than the zoned structure of the previous embodiment. As shown in FIG. 13, the forward catalyst has a top layer which contains a catalyst material PM-Rh wherein the precious metal (PM) is selected from the group consisting of platinum, palladium and combinations thereof. This top layer further includes metal oxides selected from the group consisting of oxides of aluminum, alkali metals, alkaline earth metals and combinations thereof. The top layer is, in one example, Pt and Rh in a 5:1 to 25:1 ratio with a total loading of 60–300 g/ft$^3$. This top layer is further optionally stabilized by 2–15% (wt) of BaO.

The bottom layer includes a catalyst material PM-Rh wherein the precious metal (PM) is selected from the group consisting of Pt, Pd and combinations thereof. This bottom layer can include Pt and Rh in a 1:1 to 10:1 ratio, with a total loading of 19–190 g/ft$^3$. The bottom layer can optionally include small amounts of mixed oxides such as zirconium oxide, cerium oxide and combinations thereof.

As shown in FIG. 13, the bottom layer can contain rhodium anchored on 3–5% (wt) $ZrO_2$, 2–30% (wt) BaO and MgO. In one embodiment, the alumina washcoat is stabilized by 2–8% (wt) $La_2O_3$. The alumina washcoat in the second bottom layer can optionally be stabilized by composite oxides of cerium-lanthanum.

In this embodiment, the downstream catalyst 72 has the same formulations as described above. More specifically, this downstream catalyst 72 includes a catalyst material PM-Rh, wherein the precious metal (PM) is Pt, Pd or combinations of the two. The downstream catalyst 72 can contain PM and Rh in a ratio of 5:1 to 15:1 with a total loading of 10–700 g/ft$^3$. This catalyst also includes mixed oxides of aluminum, alkali metals, alkaline earth metals or combinations thereof. Additionally, this downstream catalyst 72 includes a high concentration of mixed oxides of zirconium, cerium or their combination. Both PM and Rh can be anchored on 5–30% (wt) high surface area Ce/Zr with high $O_2$ kinetics (e.g., Ce/Zr 50:50 molar ratio). Additionally, in one embodiment, the alumina washcoat is stabilized by 10% (wt) BaO. This downstream catalyst can also optionally contain suppressants for $H_2S$ emissions such as NiO.

In yet another alternate embodiment of this invention, a single catalyst is designed to include multiple zones, where each zone is designed to provide specific functional advantages. In one embodiment, a catalyst is provided with two zones, a first-ceria containing zone designed to provide fast light-off and optimize conversion of HC, CO and NOx under stoichiometric conditions, and a second non-ceria containing zone including NOx trapping materials designed to optimize NOx reduction under lean conditions. This two-zone catalyst provides fast light-off, high activity at stoichiometric conditions and high NOx storage capabilities at lean conditions. The first ceria-containing zone protects the second non-ceria zone from exothermic reactions during aging and thus improves the durability of the second non-ceria zone. The ceria first zone also provides the ability to desulfate the second non-ceria zone. The non-ceria second zone minimizes NOx release during purges due to the absence of ceria.

In this two-zone single catalyst embodiment, the first zone can include alumina, a catalyst mixture PM-Rh where PM is a catalyst material selected from the group consisting of Pt, Pd and combinations thereof, and metal oxides of zirconium, cerium and combinations thereof. In this embodiment, the second zone can include alumina, a catalyst mixture PM-Rh as stated above and metal oxides of alkali metals, alkaline earth metals and combinations thereof.

In another embodiment, a catalyst is designed to include three zones, a first ceria-containing zone designed to provide fast light-off and optimize conversion of HC, CO and NOx under stoichiometric conditions, followed by a second non-ceria containing zone which includes NOx trapping materials designed to optimize NOx reduction under lean conditions, and a third ceria-containing zone with a $H_2S$ suppressant. Once again, the first ceria-containing zone provides fast light-off and high activity at stoichiometric conditions. This first ceria-containing zone also protects the second non-ceria zone from exothermic reaction during aging, increasing durability of the second non-ceria containing zone. The non-ceria containing zone minimizes NOx released during purging due to the absence of ceria. The third ceria-containing $H_2S$ suppressant zone minimizes the $H_2S$ emissions during desulfations of the second zone without re-poisoning the second zone. It should be noted that the third ceria containing zone could optionally include some additional NOx storage materials. Additionally, the third zone contains ceria and a precious metal PM-Rh to minimize the HC and CO emissions during NOx purges and to provide additional activity at stoichiometric conditions.

In this three-zone single catalyst embodiment, the preferable mixture for the first and second zones is the same as set forth for the two-zone single catalyst embodiment. In this three-zone embodiment, the third zone can include alumina, a catalyst mixture PM-Rh as stated above, metal oxides of zirconium, cerium and combinations thereof, and hydrogen sulfide suppressants.

EXAMPLE 1

Fumed alumina $Al_2O_3$ (15 g, Degussa), $Ba(NO_3)_2$ (7.42 g), $KNO_3$ (0.3 g), $La(NO_3)_3.6H_2O$ (20.3 g), and $H_2PtCl_6.6H_2O$ (1.48 g) are each added to 500 ml deionized water, heated to 60° C., and then mixed as solution 1 with the final desired ratios. A rhodium solution containing 0.10 g $Rh(NO_3)_4$ is deposited onto 2.6 g $ZrO_2$, dried at 80° C. for eight hours and then calcined at 600° C. for six hours. The resulting powder is crushed and added to solution 1. Meanwhile, fumed alumina $Al_2O_3$ (15 g, Degussa), $Ba(NO_3)_2$ (14.84 g), and $Rh(NO_3)_4$ (0.1 g), and $H_2PtCl_6.6H_2O$ (0.23 g) are each added to 500 ml deionized water, heated to 60° C., and then mixed as solution 2 with the final desired ratios. The top half of a core of 400 cell per square inch cordierite (2 inch in diameter and 3.25 inch in length, zone 1) was dipped into solution 1, and then dried at 80° C. overnight. This process was repeated until the desired amount of mixed compound was coated on the core. The bottom half of the core (zone 2) was then dipped into solution 2, and then dried at 80° C. overnight This process was also repeated until the desired amount of compound was coated on to the bottom half of the core. The coated core was then calcined in air at 600° C. for six hours.

EXAMPLE 2

This is a comparative example of a known catalyst. Fumed alumina (50.0 g, Degussa), and $Ba(NO_3)_2$ (17.13 g) are dissolved in 500 ml deionized water. This mixture is stirred on a hot plate for 1 hour, and then dried at 80° C. overnight, and then calcined at 600° C. for six hours. The calcined powder is ground with 2.5 g Ce/Zr mixed oxide (W. R. Grace) for 48 hours in 190 ml deionized water. Then it is dried at 80° C. overnight, and calcined at 600° C. for six hours. This powder is then mixed with $H_2PtCl_6.6H_2O$ in 2.65 g deionized water, ground for 12 hours, then dried at 80° C. and calcined at 600° C. for six hours

EXAMPLE 3

This example shows the test procedures and conditions. The steady state lean NOx trapping efficiency was measured in a flow reactor as an average efficiency during a one minute lean period under different temperatures. The feedgas cycled with 60 seconds lean and 5 seconds rich at a constant space velocity of 30,000 $hour^{-1}$. The flow rates were strictly controlled by mass flow controllers. The gas concentrations were measured by a V&F mass spectrometer. The feedgas composition was:

| Gases | Concentration (lean) | Concentration (rich) |
|---|---|---|
| NO | 500 ppm | 500 ppm |
| HC | 1500 ppm | 1500 ppm |
| CO | 0 | 4% |
| $H_2$ | 0 | 1.33% |
| $O_2$ | 6% | 0 |
| $CO_2$ | 10% | 10% |
| $H_2O$ | 10% | 10% |
| $N_2$ | balance | balance |

The lambda sweep tests were also conducted in a flow reactor at 400° C. with a gas space velocity of 30,000 $hour^{-1}$. Here the feedgas composition remains constant, except the oxygen concentration varies to achieve the desired lambda value. The feedgas contains 2000 ppm HC, 500 ppm NO, 1% CO, 0.33% $H_2$, 10% $CO_2$, 10% $H_2O$, and $N_2$ balance.

Catalyst aging is conducted in a pulse flame combustor using a proprietary aging cycle for 50 hours with a maximum gas temperature at 1000° C.

The foregoing catalyst systems constructions and compositions have been found useful in reducing harmful engine emissions. Variations and modifications of the present invention may be made without departing from the spirit and scope of the invention or the following claims. For example, the engine may operate at stoichiometry during various conditions other than just high space velocity or high exhaust temperature, e.g., during starting, during adaptive learning, during diagnosis, during default operation if a sensor or component has degraded, or various others.

The invention claimed is:

1. A system for an engine comprising:
    an upstream emission control device with a washcoat having a predetermined amount of precious metal physically segregated from NOx storage material, said upstream emission control device in a close coupled location to an exhaust manifold of the engine;
    a downstream emission control device coupled to said upstream emission control device; and
    a controller for starting the engine, operating the engine lean with retarded ignition timing to generate heat and raise temperatures of said upstream and downstream emission control devices, determining whether temperature of said upstream device has reached a predetermined value, and in response to said determination, operating the engine rich at least to reduce NOx stored in said upstream emission control device during said lean operation.

2. The system recited in claim 1 further comprising a first sensor located upstream of said upstream emission control device.

3. The system recited in claim 2 further comprising a second sensor located downstream of said downstream emission control device.

4. The system recited in claim 1 wherein no further catalysts are located upstream of said upstream emission control device.

5. The system recited in claim 1 wherein said starting is cold starting.

6. The system recited in claim 1 wherein said amount is between 30–70% by mass.

7. The system recited in claim 1, wherein said washcoat comprises two zones.

8. The system recited in claim 1, wherein said washcoat comprises different layers.

9. The system recited in claim 1, wherein said washcoat comprises different phases.

10. A system for an engine comprising:
    an upstream emission control device with a washcoat having a predetermined amount of precious metal disassociated with NOx storage material, said upstream emission control device in a close coupled location to an exhaust manifold of the engine;
    a downstream emission control device coupled to said upstream emission control device; and
    a controller for starting the engine, operating the engine lean with retarded ignition timing to generate heat and raise temperatures of said upstream and downstream emission control devices, determining whether temperature of said upstream device has reached a predetermined value, and in response to said determination, operating the engine rich at least to reduce NOx stored in said upstream emission control device during said lean operation, wherein said controller operates the engine lean with periodic rich conditions until said upstream catalyst reaches a second temperature, after which the controller operates the engine substantially at stoichiometry.

11. The system recited in claim 10 further comprising a first sensor located upstream of said upstream emission control device.

12. The system recited in claim 11 further comprising a second sensor located downstream of said downstream emission control device.

13. The system recited in claim 10 wherein no further catalysts are located upstream of said upstream emission control device.

14. The system recited in claim 10 wherein said starting is cold starting.

15. The system recited in claim 10 wherein said amount is between 30–70% by mass.

16. A system for an engine comprising:
an upstream emission control device with a washcoat having a predetermined amount of precious metal physically segregated from NOx storage material, said upstream emission control device in a close coupled location to an exhaust manifold of the engine, said upstream emission control device receiving untreated exhaust gasses from the engine;
a downstream emission control device coupled to said upstream emission control device; and
a controller for starting the engine, operating the engine lean with retarded ignition timing to generate heat and raise temperatures of said upstream and downstream emission control devices, determining whether temperature of said upstream device has reached a predetermined value, and in response to said determination, operating the engine rich at least to reduce NOx stored in said upstream emission control device during said lean operation.

17. A system for an engine comprising:
an upstream emission control device a washcoat having a predetermined amount of precious metal physically segregated from NOx storafe material, said upstream emission control device in a close coupled location to an exhaust manifold of the engine, said upstream emission control device receiving exhaust gasses from the engine;
a downstream emission control device coupled to said upstream emission control device; and
a controller for starting the engine, operating the engine slightly lean with retarded ignition tinting to generate heat and raise temperatures of said upstream and downstream emission control devices, determining whether temperature of said upstream device has reached a predetermined value, and in response to said determination, operating the engine rich at least to reduce NOx stored in said upstream emission control device during said starting lean operation.

18. The system recited in claim 17 wherein said controller operates the engine lean with periodic rich conditions until said upstream catalyst reaches a second temperature, after which the controller operates the engine substantially at stoichiometry.

* * * * *